United States Patent [19]
Kugler

[11] 3,789,973
[45] Feb. 5, 1974

[54] MATERIAL CONVEYANCE SYSTEM FOR FEEDING WORKPIECES TO A PROCESSING TOOL

[76] Inventor: Walter Kugler, Adolf-Feucht-Weg, Neuffen/Wurtt, Germany

[22] Filed: Dec. 29, 1972

[21] Appl. No.: 319,333

[52] U.S. Cl............... 198/19, 198/165, 271/DIG. 9
[51] Int. Cl............................................. B23q 7/00
[58] Field of Search...... 198/19, 160, 165; 271/3, 7, 271/DIG. 7, DIG. 9, 50

[56] References Cited
UNITED STATES PATENTS

| | | | |
|---|---|---|---|
| 2,978,095 | 4/1961 | Jenike | 198/165 |
| 3,620,139 | 11/1971 | Kulwicki | 198/19 |
| 3,405,934 | 10/1968 | Elsas | 271/7 |

FOREIGN PATENTS OR APPLICATIONS

| | | | |
|---|---|---|---|
| 784,790 | 10/1957 | Great Britain | 271/DIG. 9 |

Primary Examiner—Evon C. Blunk
Assistant Examiner—Joseph E. Valenza

[57] ABSTRACT

A material conveyance system usable for feeding workpieces formed of sheet material to a processing tool, such as a punch or perforator, and for extracting the workpieces therefrom. The workpieces are transported from a conveyor inlet station by pairs of endless belts arranged to hold the workpieces firmly between them until released at a transfer location onto a conveyor table horizontally aligned with the processing tool. Positioning members then assist insertion of the workpieces into the processing tool and align the workpieces for processing. The workpieces are extracted from the processing tool by the action of one of the pairs of endless belts circulating around a reciprocating frame arranged directly above and parallel to the conveyor table and are then transported rearward to a finished parts storage.

14 Claims, 5 Drawing Figures

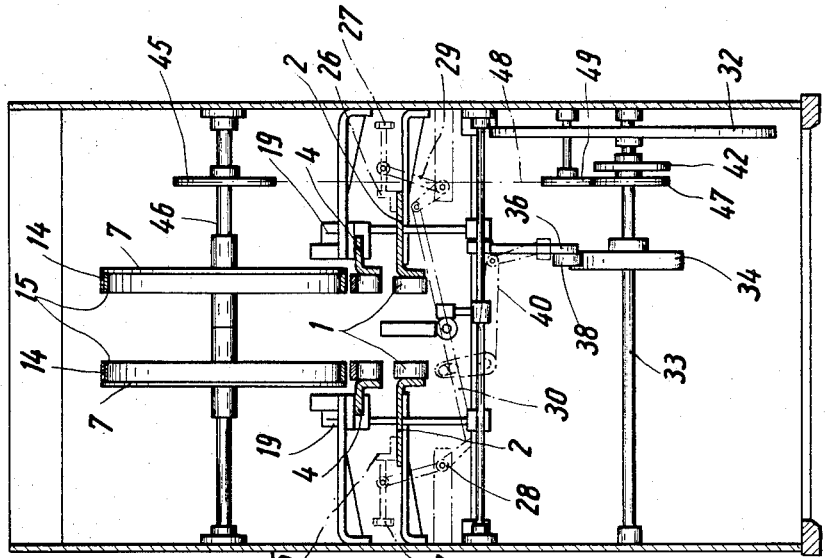
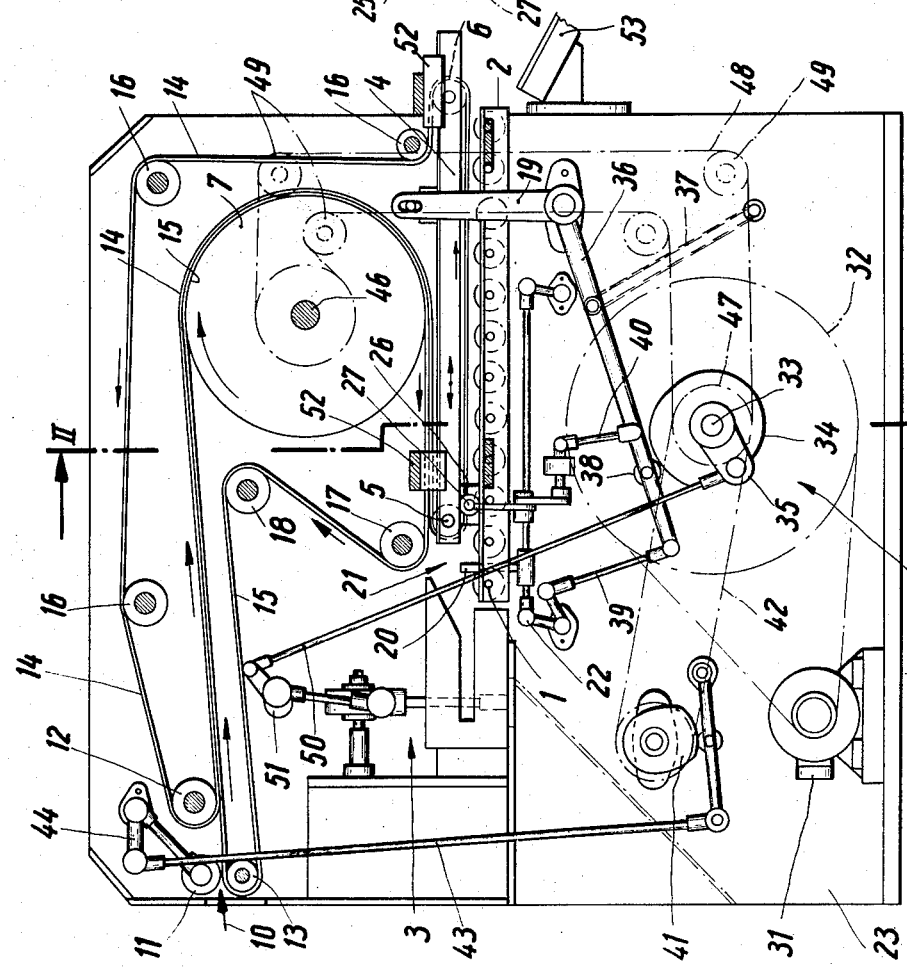

MATERIAL CONVEYANCE SYSTEM FOR FEEDING WORKPIECES TO A PROCESSING TOOL

The invention relates generally to a material conveyance system and particularly to an apparatus for feeding workpieces formed of sheet material (metal, plastic, paper, etc.) into a processing tool, such as a punch, perforator or the like, in which the workpieces are inserted into the work tool and withdrawn therefrom from one and the same side.

Due to economic considerations, machines of the above type are frequently fed by manual means. Known devices for mechanizing this feeding operation have been relatively complex and expensive and the performance thereof often unsatisfactory.

Accordingly, it is the primary object of the present invention to provide an apparatus for automatically feeding and extracting workpieces formed of sheet material to and from a processing tool, such as a punch or perforator, which is versatile, efficient, and of relatively simple construction.

It is a further object of the present invention to provide an apparatus for conveying workpieces to and from a processing tool in which two pairs of endless belts circulate around a system of driven pulleys and idler rollers in two vertical, parallel planes, the distance between the planes, and therefore between the belts, being adjustable to accommodate workpieces of different sizes.

An aspect of the present invention resides in the provision of a material conveyance system and particularly an apparatus for forwarding and extracting workpieces of a sheet-like nature to and from a processing tool. The system and apparatus includes a machine support or housing and a longitudinally extending conveyor arrangement mounted to the support in horizontal alignment with the processing tool. There is further included a first and a second endless belt conveyor system for cooperating between a workpiece inlet and a transfer station established by the two systems, one belt of the first and of the second system being positioned between said stations coextensive vertically closely above each other to establish a vertical spacing therebetween which is only sufficient to retain the sheet-like workpiece under pressure between these belts. The spacing between the belts increases at the transfer station so that the workpiece is released thereat onto the tool. A longitudinally reciprocating workpiece retracting frame is disposed above the conveyor arrangement with one of the belts extending from the transfer station between and coextensive with and in close contact to the conveyor arrangement and the frame.

For a better understanding of the present invention, together with other and further objects thereof, reference is had to the following description taken in connection with the accompanying drawings, and its scope will be pointed out in the appended claims.

In the drawings:

FIG. 1 is a side elevational view of the material conveyance system with the side cover plate removed;

FIG. 2 is a vertical cross sectional view taken along line II-II of FIG. 1; and

Figure 3:
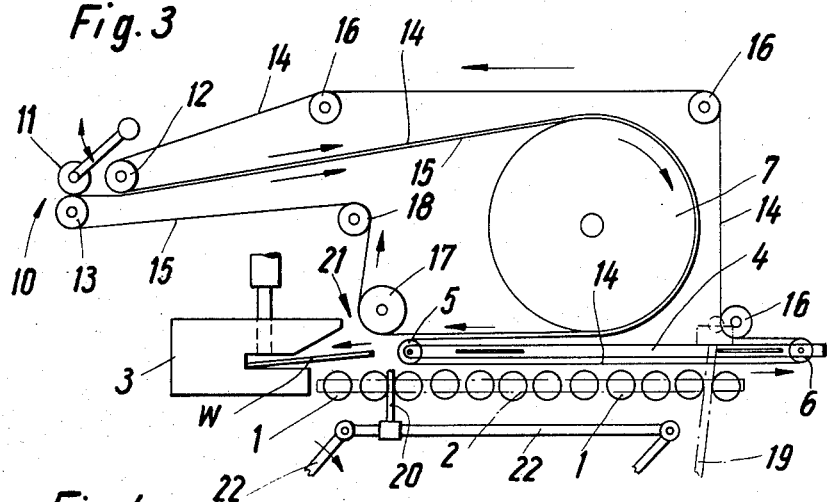
FIGS. 3, 4 and 5 are schematic views shown in the same direction as FIG. 1 and illustrating the material conveyance system in a plurality of operating positions.

Referring now to the drawings, a material conveyance system for feeding and extracting workpieces W to and from an interchangeable processing tool 3, such as a punch, is shown mounted in a machine frame or support 23 with a conveyor table 2 disposed in horizontal alignment with the tool 3 to feed and receive the workpieces W therefrom. The conveyor table 2 is provided with a plurality of freely rotatable rollers 1 arranged in two parallel rows disposed in a horizontal plane and which form the surface of the table 2. Directly above and parallel to the table 2 is a frame 4 arranged for reciprocating motion along the path of travel of the workpieces W adjacent to the table 2. The frame 4 has a pair of idler rollers 5 mounted at its forward end and a similar pair of rollers 6 mounted at the opposite end thereof.

Above the reciprocating frame 4 is a system of driven pulleys and idler rollers arranged in such a manner that two pairs of endless belts 14, 15, operating as hereinafter described, circulate in two parallel, vertical planes. One endless belt 15, of a pair of endless belts, circulates over a driven pulley 7, constituting a turn station which changes the direction of the belts approximately 180°, and around idler rollers 13, 17, 18 which are disposed to direct the belt 15 in a path adjacent to the reciprocating frame 4 in the section between the pulley 7 and the roller 17, and away from other members of the conveyance system to a workpiece inlet station 10 adjacent to the roller 13 and thence back over the pulley 7. One endless belt 14 of another pair of endless belts circulates over and in contact with the belt 15 around the pulley 7 and thence, in succession, around the roller 5 and the roller 6 of the frame 4, a plurality of idler rollers 16, an idler roller 12 adjacent to the inlet 10, and back over the belt 15 and around the pulley 7. A second set of endless belts 14, 15 is arranged to circulate around another set of idler rollers and a driven pulley in a manner identical to that just described. The belts 14, 15 circulate in contact with each other, as shown in FIG. 1, from a point adjacent to the inlet 10 continuing around the pulleys 7 to a workpiece transfer station or location 21 at the forward end of the table 2. The distance between the pulleys 7 is adjustable to accommodate workpieces of a different size.

The workpiece W is aligned after insertion into the work tool 3 by a longitudinal positioning member 20, located between the two rows of rollers 1 adjacent to the transfer location 21, which engages the rear edge of the workpiece W and pushes it completely into the tool 3. The member 20 is connected to a parallel crank drive means 22 located below the table 2 and pivotably mounted to the frame 23. Transverse alignment of the workpiece W with the centerline of the feed path is provided by transverse positioning members 25, 26 arranged in an opposing relationship relative to the workpiece W at the transfer location 21. The distance between the members 25, 26 is adjustable by means of two threaded shafts 27 which are driven in reciprocating and opposing motions by cranks 28, 29 pivotably mounted to the frame 23. The cranks 28, 29 are connected to the shafts 27 at one common end and are connected at their other common end by a rod 30.

Mounted at the base of the frame 23 is an electric motor 31 driving a control shaft 33, transversely mounted to the frame 23, by means of a belt pulley or chain sprocket 32. Non-rotatably mounted on the shaft 33 are a cam 34 and a crank arm 36. The crank arm 36 is pivotably connected at its forward end to a linkage 39 which is in turn connected to the parallel crank drive 22 of the member 20. The crank arm 36 is rigidly attached at its rearward end to the linkage 19 which imparts the longitudinal reciprocating motion to the frame 4. Also pivotably attached to the crank arm 36 at its approximate mid-section is another linkage 40 connecting to the rod 30 which drives the positioning members 25, 26 through the cranks 28, 29 and the threaded rods 27. The cam follower 38 is held against the cam 34 by the tension of a spring 37 mounted between the arm 36 and the frame 23. Since the linkages 19, 39, 40 are driven by the arm 36, the members connected thereto operate in synchronism. The crank 35, also mounted on the shaft 33, is connected through a linkage rod 50 to an eccentric drive 51 of the processing tool 3. The tool 3 can be, for example, a stamping tool interchangeably attached to the frame 23. The tool 3 is thus driven in synchronism with other operating members of the feed apparatus. The inlet 10 comprises the rollers 13 and opposing rollers 11 whose opening and closing motions are also synchronized with the operation of the other machine components such as the positioning members. The rollers 11 are mounted on one arm of a double-arm lever 44 which is pivotably mounted to the frame 23 and connected by a rod 43 to a cam drive 41. The cam drive 41 is driven by a sprocket chain 42 from shaft 33 in a 1:1 ratio.

The two pulleys 7 are also driven from the shaft 33 by a chain drive means consisting of a sprocket 45 non-rotatably mounted on the shaft 46, an endless chain 48, a plurality of rotatable deflecting wheels 49, and a sprocket 47 non-rotatably mounted on the shaft 33.

Figure 4:
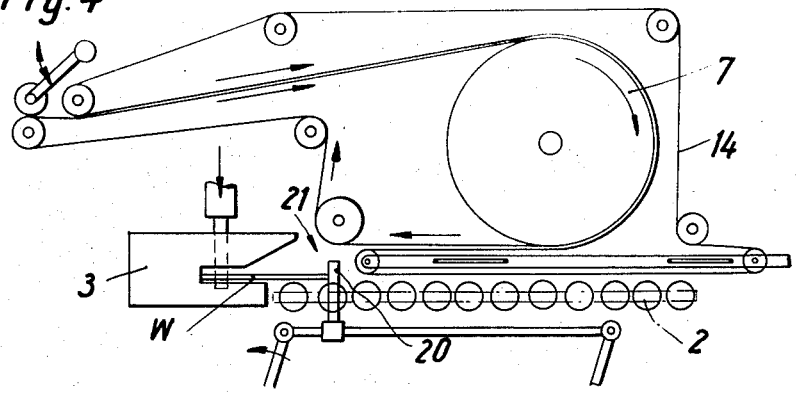
Figure 5:
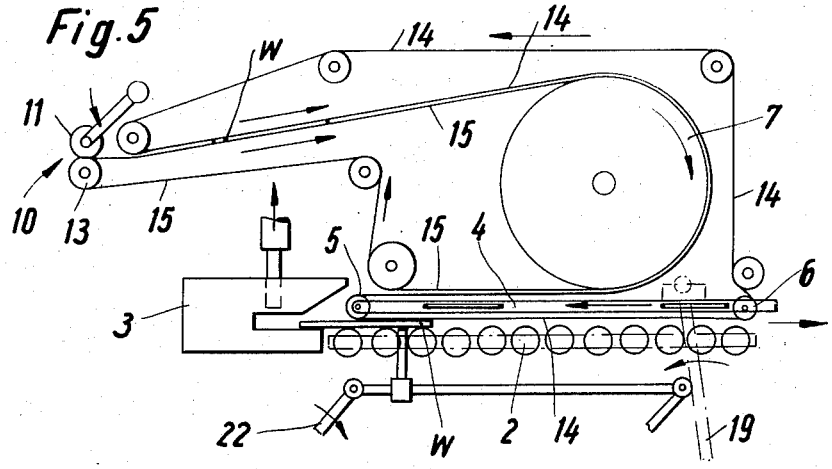

The feed apparatus operates as follows:

The workpieces W are passed from a stack by a suitable pick-up device of any known type, not shown, to the conveyor inlet 10 and seized in sequence between the feed rollers 11 and the rollers 13. The workpieces W are then inserted at spaced intervals between the two pairs of belts 14, 15 circulating over the rollers 12, 13. As shown in FIG. 5, the belts 14, 15 hold the workpieces W firmly between them to transport them around the pulleys 7 and onto the transfer location 21 where they are injected into the tool 3. The positioning members 20 and 25, 26 then push the workpieces W firmly into the tool 3 and align them for processing therein as shown in FIG. 4.

After the member 20 moves rearward to its starting position below the surface of feed table 2, the reciprocating frame 4 is moved from its rearward position to its forward position, as shown in FIG. 5, so that the belt pair 14 which passes around the frame 4 and movably travels with it bears against the portion of the workpiece W projecting out of the tool 3. The workpieces W are thus extracted from the tool 3 rearward over the table 2 to a storage shelf 53 of a known type at the rear end of the device. During this extraction operation, the frame 4 returns to its rearward position to clear the transfer location 21 for insertion of another workpiece. This ensures rapid feeding of the workpieces and a high output from the machine.

The number of belts arranged side by side is governed by the width and stiffness of the workpieces, i.e., more than two belts may be provided.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A material conveyance system and particularly an apparatus for feeding and extracting workpieces of sheet-like material to and from a processing tool comprising:

a machine support;

longitudinally extending conveyor means mounted to said support in horizontal alignment with said processing tool;

a first and a second endless belt conveyor system established and adapted for cooperating between a workpiece inlet and a transfer station, one belt of the first and of the second system being positioned between said stations co-extensive vertically closely above each other establishing a vertical spacing therebetween only sufficient to retain a sheet-like workpiece under pressure, the spacing between said belts increasing at said transfer station for releasing said workpiece onto said tool; and a longitudinally reciprocating workpiece retracting frame disposed above said conveyor means, one of said belts extending from said transfer station between and co-extensive with and in close contact to said conveyor means and frame.

2. A material conveyance system according to claim 1, wherein said conveyor means is a stationary conveyor table.

3. A material conveyance system according to claim 2, wherein said conveyor table is provided with a plurality of freely rotatable rollers arranged in two parallel rows which form the surface of said table.

4. A material conveyance system according to claim 1, wherein each endless belt conveyor system comprises a pair of belts extending parallel but spaced transversely in the direction of travel.

5. A material conveyance system according to claim 4, and a turn station between said inlet and transfer stations, effective to change the direction of said belts about 180°.

6. A material conveyance system according to claim 5, wherein said cooperating belts ahead of and past said turn station extend horizontally.

7. A material conveyance system according to claim 1, and a longitudinal positioning member pivotably mounted on said support at said transfer station, and a driven linkage to sequentially move said longitudinal positioning member horizontally against the workpiece and, during the workpiece withdrawal movement, out of the withdrawal path of said workpiece.

8. A material conveyance system according to claim 7, and a transverse positioning member pivotably mounted on said support on each side of said workpiece adjacent to said transfer station, and a driven linkage to align said workpiece with the center line of the feed path of said workpieces.

9. A material conveyance system according to claim 1, wherein said inlet station comprises two pairs of idler rollers arranged one above the other in a staggered relationship, with each pair of said rollers effecting a 180° turn of one pair of said belts, and a pair of feed rollers pivotably mounted to said frame, said feed rollers being pivotably movable by a driven linkage and effective to sequentially feed said workpieces to said conveyance system.

10. A material conveyance system according to claim 1, wherein said frame is provided with a pair of idler rollers at the forward end thereof adjacent to said transfer station and another pair of idler rollers at the rearward end thereof for supporting and guiding a pair of said belts in close proximity to said conveyor means, and a driven linkage system connected to said frame to impart said reciprocating motion to said frame.

11. A material conveyance system according to claim 8, and a continuously driven control shaft rotatably mounted on said machine support in a transverse position below said conveyor means; said shaft being connected by a cam, crank arm, and linkage means to said longitudinal positioning member, said transverse positioning member, and said frame; said shaft with said cam, crank arm, and linkage means being effective to synchronously operate the positioning members and the displaceable frame.

12. A material conveyance system according to claim 1, wherein said processing tool is interchangeably mounted on said machine frame and is provided with a driven linkage for synchronous operation with said longitudinal and transverse positioning members.

13. A material conveyance system according to claim 9, wherein said feed rollers are pivotably movable in synchronism with said processing tool, said positioning members, and said displaceable frame by a cam drive, linkage, and endless chain means driven from said control shaft.

14. A material conveyance system according to claim 4, wherein the upper pair of said endless belts extending from said turn station to said transfer station is the lower pair of said endless belts in the section between said inlet and turn stations.

* * * * *